US008537844B2

(12) United States Patent
Lee et al.

(10) Patent No.: US 8,537,844 B2
(45) Date of Patent: Sep. 17, 2013

(54) ETHERNET TO SERIAL GATEWAY APPARATUS AND METHOD THEREOF

(75) Inventors: Kwang-Il Lee, Daejeon (KR); Jun-Hee Park, Daejeon (KR); Won-Suk Choi, Daejeon (KR); Kyeong-Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 12/898,787

(22) Filed: Oct. 6, 2010

(65) Prior Publication Data

US 2011/0080914 A1  Apr. 7, 2011

(30) Foreign Application Priority Data

Oct. 6, 2009 (KR) .................. 10-2009-0094716
Apr. 15, 2010 (KR) .................. 10-2010-0034986

(51) Int. Cl.
*H04L 12/28* (2006.01)
*H04L 12/56* (2011.01)
*G06F 15/173* (2006.01)

(52) U.S. Cl.
USPC .................................. 370/401; 709/238

(58) Field of Classification Search
CPC ..................................................... H04L 69/22
USPC ............... 370/394, 401, 392; 709/238, 246
See application file for complete search history.

(56) References Cited

U.S. PATENT DOCUMENTS

| 6,434,117 | B1 |   | 8/2002 | Momona |
|---|---|---|---|---|
| 2002/0021664 | A1 | * | 2/2002 | Baretzki ........................ 370/229 |
| 2004/0095464 | A1 | * | 5/2004 | Miyagi et al. ................... 348/65 |
| 2005/0076147 | A1 | * | 4/2005 | Blake et al. .................... 709/246 |
| 2007/0150262 | A1 | * | 6/2007 | Mori et al. ..................... 704/201 |
| 2007/0160052 | A1 | * | 7/2007 | Okada ............................ 370/392 |
| 2007/0195834 | A1 | * | 8/2007 | Tanaka et al. ................... 372/24 |
| 2008/0240140 | A1 | * | 10/2008 | Dabagh et al. ................ 370/412 |
| 2009/0129386 | A1 | * | 5/2009 | Rune .............................. 370/392 |
| 2010/0082819 | A1 | * | 4/2010 | Wang ............................. 709/227 |
| 2010/0293043 | A1 | * | 11/2010 | Atreya et al. ................. 705/14.4 |
| 2011/0231470 | A1 | * | 9/2011 | Thompson et al. ........... 709/201 |

FOREIGN PATENT DOCUMENTS

DE 19615905 C1 * 11/1997

* cited by examiner

*Primary Examiner* — Ayaz Sheikh
*Assistant Examiner* — Hoang-Chuong Vu
(74) *Attorney, Agent, or Firm* — Staas & Halsey LLP

(57) ABSTRACT

Provided is an Ethernet-to-serial gateway apparatus including: a buffer manager to verify a characteristic of a data packet received via an Ethernet interface, and to thereby select a buffer for storing the data packet, and to store the data packet in the selected buffer; a packet scheduler to extract a data packet from the buffer according to a predetermined policy; a packet distributor to verify a destination address of the extracted data packet, and to thereby obtain serial interface information associated with at least one target apparatus to which the extracted data packet is transmitted; and a serial communication unit to transmit the extracted data packet to the at least one target apparatus via a corresponding serial interface based on the serial interface information.

15 Claims, 4 Drawing Sheets

ETHERNET TO SERIAL GATEWAY APPARATUS AND METHOD THEREOF

CROSS REFERENCE TO RELATED APPLICATIONS

This application claims priority to Korean Patent Application No. 10-2009-0094716 filed on Oct. 6, 2009 and Korean Patent Application No. 10-2010-0034986 filed on Apr. 15, 2010, the entire contents of which are herein incorporated by reference.

BACKGROUND OF THE INVENTION

1. Field of the Invention

The present invention relates to an Ethernet-to-serial gateway apparatus for Internet Protocol (IP) multicasting and a method thereof. More particularly, the present invention relates to a gateway apparatus and a method that may effectively transmit IP multicasting data via a serial interface.

2. Description of the Related Art

Many ship apparatuses such as a navigation apparatus and sensors within a ship may exchange information through a communication mechanism performing a message exchange based on American Standard Code for Information Interchange (ASCII) such as National Marine Electronics Association (NMEA) 0183 via a serial interface such as Recommended Standard (RS) 485.

However, due to a new paradigm such as e-navigation, an amount of information exchanged between apparatuses on a ship is currently increasing. Accordingly, instead of a low speed serial interface, a use of a high speed Ethernet interface greater than or equal to 100 Mbps is increasing.

Accordingly, a function about an Ethernet-to-serial gateway performing a transformation functionality between the high speed Ethernet interface and the low speed serial interface, and between an Internet-based protocol and an NMEA 0183-based protocol has become important.

In the case of a ship navigation apparatus based on a serial interface, basically to obtain information required for a single ship apparatus, apparatuses desiring information may obtain the information through a one-to-one connection with other apparatuses providing the information.

This indicates that N serial interfaces may need to be provided to transfer information to N apparatuses in the single ship apparatus. Specifically, the same data may need to be copied and be provided to the N serial interfaces.

The above one-to-N communication scheme may be easily performed in an Ethernet-based Internet Protocol (IP) network through IP multicasting. Specifically, when apparatuses desiring particular information are grouped into a single group and apparatuses belonging to the same group share a single IP multicasting address, information exchange between the apparatuses having the same IP multicasting address may be performed using a single transmission.

However, on a ship with an Ethernet-based IP network, all the apparatuses are generally connected to the same subnet. Therefore, when IP multicasting is performed, all the apparatuses included in the same network may receive the same data, similar to broadcasting.

In particular, when an Ethernet-to-serial gateway apparatus connected to a plurality of apparatuses via respective corresponding serial interfaces does not provide a particular filtering mechanism, data may be transmitted to all the apparatuses via all the serial interfaces. Consequently, data may be transmitted to an undesired apparatus, which may result in causing overhead, thereby deteriorating a transmission efficiency.

Even though some of navigation information needs to be sequentially received, a plurality of pieces of navigation information may be periodically transmitted. Accordingly, reliable and sequential information may not be required at all times.

In particular, when information is transferred via a low speed serial interface, overflow may occur in a buffer due to a large amount of information received via a high speed Ethernet interface. In the case of the above navigation information, most current information should be safely transmitted first than previously transmitted information. However, in the case of a queuing scheme using a simple last-in-first-output (LIFO) scheme, old navigation information may be transmitted after the latest navigation information is transmitted, which may be inappropriate.

SUMMARY OF THE INVENTION

The present invention is conceived to solve the aforementioned problems and thus provides a method of managing a group and a buffer that may effectively transmit navigation information, received via Ethernet, to a target apparatus via a serial interface in a gateway apparatus connecting a high speed Ethernet interface and a low speed serial interface.

According to an aspect of the present invention, there is provided a gateway apparatus including: a buffer manager to verify a characteristic of a data packet received via an Ethernet interface, and to thereby select a buffer for storing the data packet, and to store the data packet in the selected buffer; a packet scheduler to extract a data packet from the buffer according to a predetermined policy; a packet distributor to verify a destination address of the extracted data packet, and to thereby obtain serial interface information associated with at least one target apparatus to which the extracted data packet is transmitted; and a serial communication unit to transmit the extracted data packet to the target apparatus via a corresponding serial interface based on the serial interface information.

In particular, the gateway apparatus may further include a group manager to manage group information associated with a group including a plurality of target apparatuses corresponding to the destination address of the extracted data packet and serial interface information corresponding to each of the target apparatuses included in the group.

Also, the group manager may perform snooping of a message received from target apparatuses connected via each corresponding serial interface to set the group information.

Also, the group manager may set the group information according to a characteristic of target apparatuses connected via each corresponding serial interface.

In verifying the characteristic of the data packet received via the Ethernet interface, the buffer manager may use a destination Internet Protocol (IP) address of the data packet, a User Datagram Protocol (UDP) port number thereof, or a Transmission Control Protocol (TCP) port number thereof.

Also, the serial interface may correspond to a serial interface based on National Marine Electronics Association (NMEA) 0183.

Also, the buffer manager may store the data packet in an overwritable buffer or a non-overwritable buffer according to the characteristic of the data packet.

Also, the non-overwritable buffer may be configured into a first-in-first-out (FIFO) form.

In storing the data packet in the overwritable buffer, the buffer manager may set and maintain a number of buffers using at least one of a destination IP address, a UDP port number, a TCP port number, and a transmission end address.

In storing the data packet in the overwritable buffer, the buffer manager may store the data packet by including information associated with a stored time.

In storing the data packet in the overwritable buffer, when the same type of a data packet exists in the corresponding buffer, the buffer manager may store the data packet by replacing the existing data packet with a newly received data packet.

When extracting a data packet from the overwritable buffer, the packet scheduler may priorly extract a most previously stored data packet based on information associated with the stored time.

According to another aspect of the present invention, there is provided a method for communication at a gateway apparatus, the method including: receiving a data packet via an Ethernet interface; verifying a characteristic of the received data packet to select a buffer for storing the data packet; storing the data packet in the selected buffer; extracting a data packet from the buffer according to a predetermined policy; verifying a destination address of the extracted data packet to thereby obtain serial interface information associated with at least one target apparatus to which the extracted data packet is transmitted; and transmitting the extracted data packet to the target apparatus via a corresponding serial interface based on the serial interface information.

In particular, the method may further include managing group information associated with a group including a plurality of target apparatuses corresponding to the destination address of the extracted data packet and serial interface information corresponding to each of the target apparatuses included in the group.

Also, the managing of the group information including the plurality of target apparatuses may include performing snooping of a message received from target apparatuses connected via each corresponding serial interface to set the group information.

Also, the managing of the group information including the plurality of target apparatuses may include setting the group information according to a characteristic of target apparatuses connected via each corresponding serial interface.

Also, the verifying of the characteristic of the received data packet may include using a destination IP address of the data packet, a UDP port number thereof, or a TCP port number thereof.

Also, the buffer for storing the data packet may correspond to an overwritable buffer or a non-overwritable buffer.

Also, the non-overwritable buffer may be configured into a FIFO form.

In storing the data packet in the overwritable buffer, the data packet may be stored by including information associated with a stored time.

According to embodiments of the present invention, the following effect may be obtained. Specifically, it is possible to configure a simplified and effective ship communication system by providing a method of managing a group and a buffer to effectively transmit navigation information, received via Ethernet, to a target apparatus via a serial interface.

DETAILED DESCRIPTION OF THE PREFERRED EMBODIMENTS

Figure 1:
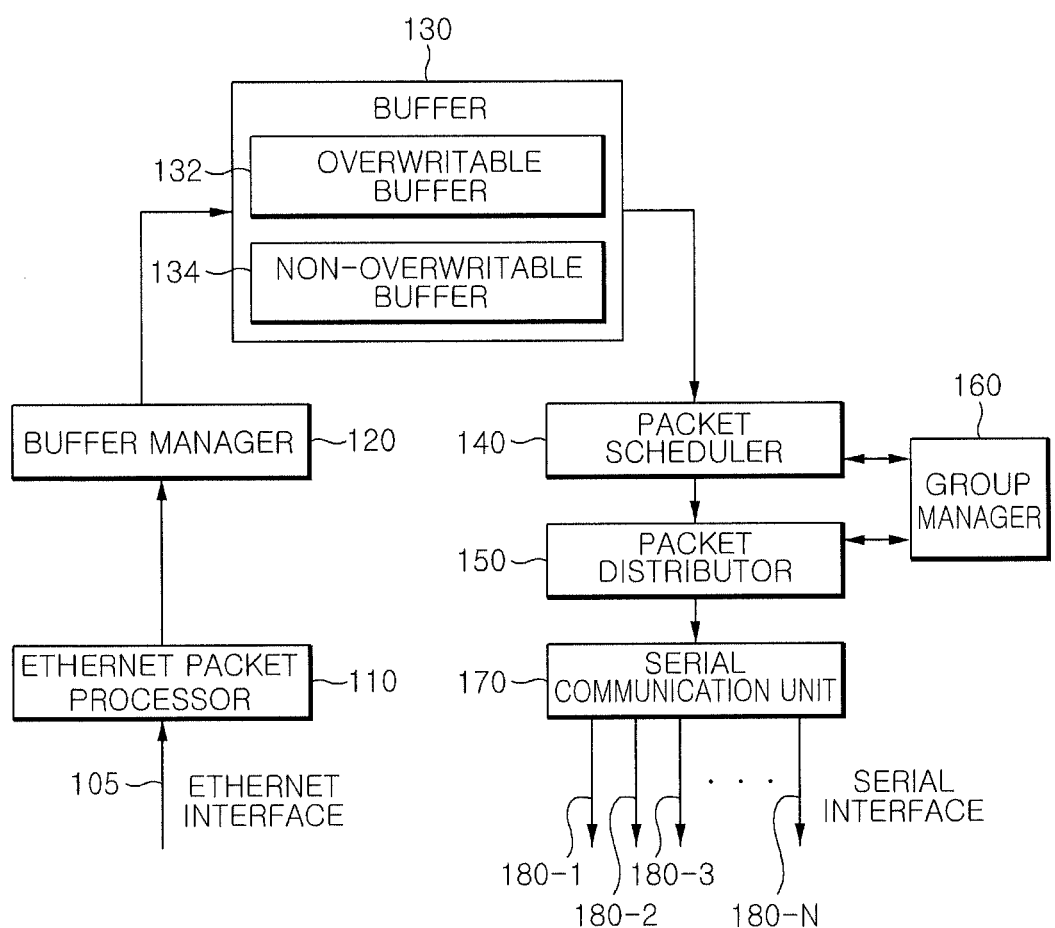
FIG. 1 is a block diagram illustrating a configuration of an Ethernet-to-serial gateway apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they make the purpose of the present invention unnecessarily ambiguous in describing the present invention, the detailed description will be omitted here. Embodiments of the present invention are provided to further fully describe the present invention for those having ordinary knowledge in the art. Accordingly, shapes, sizes, and the like of elements of drawings may be exaggerated for more clear description.

FIG. 1 is a block diagram illustrating a configuration of an Ethernet-to-serial gateway apparatus according to an embodiment of the present invention.

Referring to FIG. 1, the Ethernet-to-serial gateway apparatus may support at least one Ethernet interface and at least one serial interface. In this instance, buffering may be required to transmit, via a low speed serial interface, information received at the gateway apparatus via a high speed Ethernet interface. Due to the buffering, a delay time may occur.

To process the above matter, the gateway apparatus of the present invention may include an Ethernet packet processor 110, a buffer manager 120, a buffer 130, a packet scheduler 140, a packet distributor 150, a group manager 160, and a serial communication unit 170.

The Ethernet packet processor 110 may receive a data packet, for example, an Internet Protocol (IP) packet via an Ethernet interface 105, process the received data packet according to a determined protocol, and transfer the processed data packet to the buffer manager 120.

The buffer manager 120 may verify a characteristic of the data packet received via the Ethernet interface 105 to select a buffer for storing the data packet, and may store the received data packet in the selected buffer.

Specifically, the buffer manager 120 may verify the characteristic of the data packet using a destination address, [for example, a destination IP (multicasting) address] of the data packet transferred from the Ethernet packet processor 110, a User Datagram Protocol (UDP) port number thereof, or a Transmission Control Protocol (TCP) port number thereof. The buffer manager 120 may store the data packet in an overwritable buffer 132 or a non-overwritable buffer 134 depending on the characteristic of the data packet. When the data packet corresponds to an overwritable data packet, the buffer manager 120 may store the data packet in the overwritable buffer 132. When the data packet corresponds to a non-overwritable data packet, the buffer manager 120 may store the data packet in the non-overwritable buffer 134. When storing the data packet in the overwritable buffer 132, the buffer manager 120 may set and maintain a number of overwritable buffers 132 using a destination IP address, a UDP port number, a transmission end address, and the like.

The buffer 130 may include two classes of buffers. Specifically, the buffer 130 may include the overwritable buffer 132 and the non-overwritable buffer 134, and may store the data packet in a corresponding buffer according to control of the buffer manager 120.

The overwritable buffer 132 may be configured into a first-in-first-out (FIFO) form having a size of N.

In the case of the non-overwritable buffer 134, regardless of types of data packets, all the non-overwritable data packets may share the single non-overwritable buffer 134. Accordingly, when the non-overwritable buffer 134 is filled with data, all the data packets subsequently arriving at the filled non-overwritable buffer 134 may be lost.

However, the overwritable buffer 132 may be configured into a buffer having a size of "1" at all times and thus may be provided for each type (traffic class) of data packets.

For example, when M types, that is, M traffic classes of data packets use the overwritable buffer 132, M(1×M) overwritable buffers 132 may exist. In addition, when the same type of data packet exists in storing the data packet, the overwritable buffer 132 may store the data packet by replacing the existing data packet with the newly received data packet. Accordingly, once the same type of data packet is received, previous data may be lost in the overwritable buffer 132 at all times.

The packet scheduler 140 may extract a data packet from two classes of buffers, that is, the overwritable buffer 132 and the non-overwritable buffer 134 included in the buffer 130, according to a predetermined policy, and may transfer the extracted data packet to the packet distributor 150.

The packet distributor 150 may verify a destination address of the packet address extracted by the packet scheduler 140, and may obtain, from the group manager 160, serial interface information associated with at least one target apparatus to which the extracted data packet is transmitted. The packet distributor 150 may copy the data packet to be transmitted as many as required, based on the obtained serial interface information, and may transfer the copied data packets to the serial communication unit 170.

Specifically, the packet distributor 150 may verify the destination address of the data packet and thereby verify whether the corresponding data packet needs to be transmitted to a group (target group) including a plurality of target apparatuses. In the case of a data packet that needs to be transmitted to a target group, the packet distributor 150 may obtain, from the group manager 160, serial interface information associated with target apparatuses included in the corresponding target group. The packet distributor 150 may transfer, to the serial communication unit 170, the serial interface information obtained from the group manager 160 and list information associated with data to be transmitted to the target apparatuses. Here, the target apparatus may denote an apparatus to be installed within a ship such as a navigation apparatus of receiving navigation information within the ship, and may communicate with the gateway apparatus of the present invention via an NMEA 0183-based serial interface.

The group manager 160 may manage group information associated with a group including a plurality of target apparatuses corresponding to the destination address of the data packet extracted via the packet scheduler 140, and serial interface information corresponding to each of the target apparatuses belonging to the group. According to a request of the packet distributor 150, the group manager 160 may provide the group information and the serial interface information to the packet distributor 150.

In setting the group information, the group manager 160 may set the group information by performing snooping of a message received from target apparatuses connected via serial interfaces 180-1 through 180-N. Also, the group manager 160 may set the group information according to a characteristic of the target apparatuses connected via the serial interfaces 180-1 through 180-N.

The serial communication unit 170 may receive the data packet and the serial interface information from the packet distributor 150, and may transmit the data packet to at least one corresponding target apparatus via at least one serial interface among the serial interfaces 180-1 through 180-N based on the data packet and the serial interface information.

When transmission of the data packet is completed, the serial communication unit 170 may transfer, to the packet scheduler 140, a message indicating that transmission of the data packet is completed. Until all the data of the buffer 130 is transmitted, the packet scheduler 140 may continuously extract a data packet and transfer the extracted data packet to the packet distributor 150 according to the predetermined policy.

Figure 2:
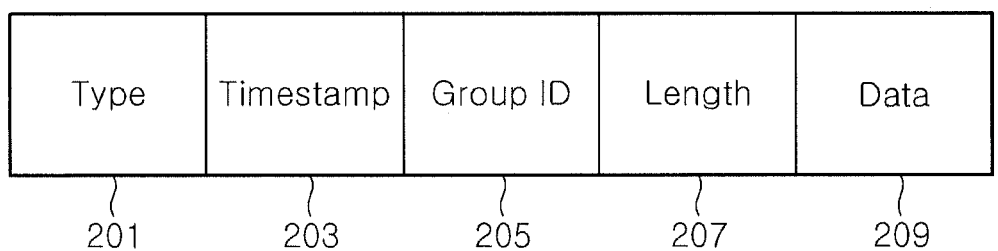
FIG. 2 is a diagram illustrating a basic data format for managing, by a buffer manager, an overwritable buffer according to an embodiment of the present invention.

FIG. 2 is a diagram illustrating a basic data format for managing, by a buffer manager, an overwritable buffer according to an embodiment of the present invention.

Referring to FIG. 2, in the case of data stored in an overwritable buffer class, the data may include a "Type" 201 indicating a type of data, a "Group ID" 205 indicating information associated with a destination of data, a "Timestamp" 203 indicating a time when data arrives at a gateway apparatus or when the data is stored in the buffer, a "Length" 207 indicating a size of data, and "Data" 209 containing actual information. Here, "Type" and "Group ID" may be used as identifiers to identify corresponding information.

The buffer manager may compare newly received data with existing data stored in the buffer (overwritable buffer). When the same type of data exists in the buffer, the buffer manager may replace the existing data with the newly received data. In this case, "Timestamp" may not be updated.

Accordingly, "Timestamp" indicates not a time when the newly received data arrives at the gateway apparatus or a time when the newly received data is stored in the buffer, but a time when the same type of data arrives at the gateway apparatus or a time when the same type of data is stored in the buffer.

Figure 3:
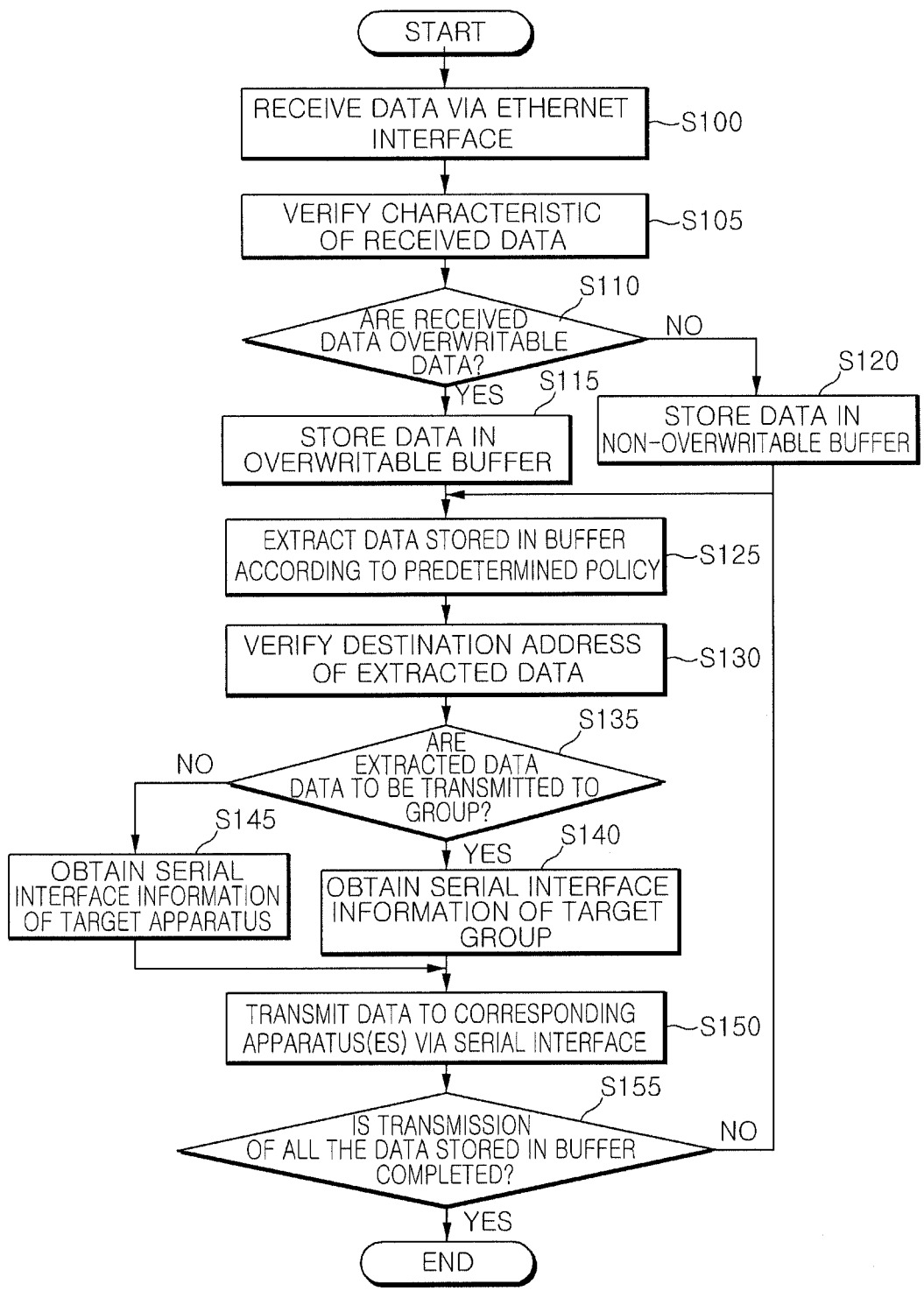
FIG. 3 is a flowchart illustrating a method of processing data at an Ethernet-to-serial gateway apparatus according to an embodiment of the present invention.

FIG. 3 is a flowchart illustrating a method of processing data at an Ethernet-to-serial gateway apparatus according to an embodiment of the present invention.

The data processing method at the Ethernet-to-serial gateway apparatus according to the present invention may include receiving a data packet via an Ethernet interface, verifying a characteristic of the received data packet to select a buffer for storing the data packet, storing the data packet in the selected buffer, extracting a data packet from the buffer according to a predetermined policy, verifying a destination address of the extracted data packet to thereby obtain serial interface information associated with at least one target apparatus to which the extracted data packet is transmitted, and transmitting the extracted data packet to the at least one target apparatus via a corresponding serial interface based on the serial interface information.

Hereinafter, the data processing method will be further described with reference to FIG. 3.

An Ethernet packet processor may receive a data packet, for example, an IP packet via an Ethernet interface, process the received data packet according to a predetermined protocol, and transfer the processed data packet to a buffer manager (S100).

The buffer manager may verify a characteristic of the data packet using a destination address [for example, a destination IP (multicasting) address] of the data packet transferred from the Ethernet packet processor, a UDP port number thereof, or a TCP port number thereof (S105). The buffer manager may store the data packet in an overwritable buffer or a non-overwritable buffer depending on the characteristic of the data packet (S110, S115, and S120).

When the data packet corresponds to an overwritable data packet, the buffer manager may store the data packet in the overwritable buffer. When the data packet corresponds to a non-overwritable data packet, the buffer manager may store the data packet in the non-overwritable buffer. When storing the data packet in the overwritable buffer, the buffer manager may set and maintain a number of overwritable buffers using a destination IP address, a UDP port number, a transmission end address, and the like.

A packet scheduler may extract a data packet from two classes of buffers included in the buffer, according to a predetermined policy, and may transfer the extracted data packet to a packet distributor (S125).

The packet distributor may verify a destination address of the packet address extracted by the packet scheduler, and may obtain, from a group manager, serial interface information associated with at least one target apparatus to which the extracted data packet is transmitted (S130 to S145).

The packet distributor may copy the data packet to be transmitted as many as required, based on the obtained serial interface information, and may transfer the copied data packets to a serial communication unit.

Specifically, the packet distributor may verify the destination address of the data packet and thereby verify whether the corresponding data packet needs to be transmitted to a group (target group) including a plurality of target apparatuses. In the case of a data packet that needs to be transmitted to a target group, the packet distributor may obtain, from the group manager, serial interface information associated with target apparatuses included in the corresponding target group. The packet distributor may transfer, to the serial communication unit, the serial interface information obtained from the group manager and list information associated with data to be transmitted to the target apparatuses.

The serial communication unit may receive the data packet and the serial interface information from the packet distributor, and may transmit the data packet to at least one corresponding target apparatus via at least one serial interface based on the data packet and the serial interface information (S150).

When transmission of the data packet is completed, the serial communication unit may transfer, to the packet scheduler, a message indicating that transmission of the data packet is completed. Until all the data of the buffer is transmitted, the packet scheduler may continuously extract a data packet and transfer the extracted data packet to the packet distributor according to the predetermined policy (S155).

Figure 4:
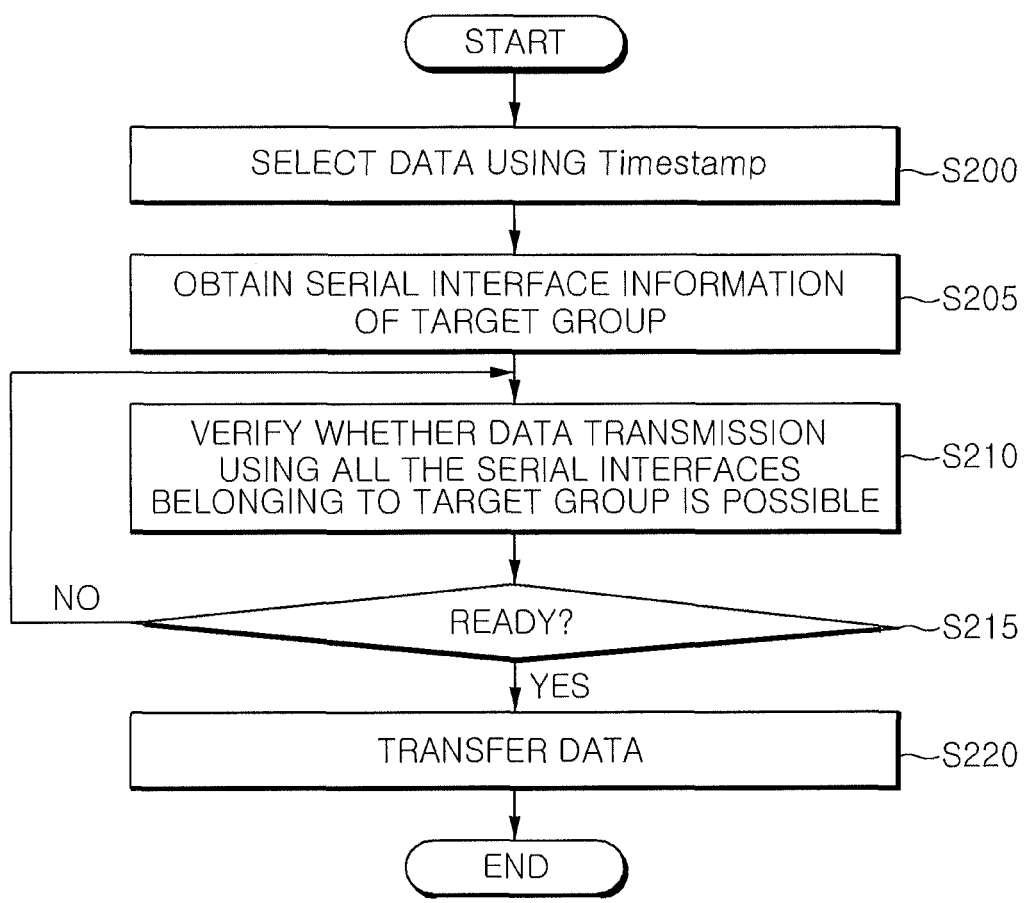
FIG. 4 is a flowchart illustrating a process of extracting, by a packet scheduler, a data packet from an overwritable buffer and a process of processing, by a packet distributor, a data packet according to an embodiment of the present invention.

FIG. 4 is a flowchart illustrating a process of extracting, by a packet scheduler, a data packet from an overwritable buffer and a process of processing, by a packet distributor, a data packet according to an embodiment of the present invention.

Referring to FIG. 4, the packet scheduler may compare "Timestamp" for each data type (classification by Group ID and Type), and may select and extract, from the overwritable buffer, a data packet having an oldest "Timestamp" (S200). As described above, "Timestamp" indicates not a time when the newly received data arrives at a gateway apparatus or a time when the newly received data is stored in the buffer, but a time when the same type of data arrives at the gateway apparatus or a time when the same type of data is stored in the buffer.

The packet distributor may verify a destination address of the data packet extracted by the packet scheduler, and obtain, from a group manager, serial interface information associated with a target group including at least one target apparatus to which the extracted data packet is transmitted (S205).

The packet distributor may verify whether data transmission using all the serial interfaces belonging to the target group is possible (S210). When all the serial interfaces are in a "READY" state (S215), the packet distributor may process the data to be transmitted to the target group via the serial communication unit (S220). In this instance, when other data stored in the buffer is simultaneously transmittable, the packet distributor may process the other data stored in the buffer to be simultaneously transmitted.

When data transmission to the target group via the serial interface is completed and a state of the corresponding serial interface is changed from a "BUSY" state to a "READY" state, the serial communication unit may inform the packet scheduler about the above change. Accordingly, the packet scheduler may inspect the buffer to verify whether transmittable data exists in the buffer, and may initiate again data transmission depending on the verification result.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A gateway apparatus comprising:
    a buffer manager to verify a characteristic of a data packet received via an Ethernet interface, and to thereby select a buffer for storing the data packet, and to store the data packet in the selected buffer;
    a packet scheduler to extract a data packet from the buffer according to a predetermined policy;
    a packet distributor to verify a destination address of the extracted data packet, and to thereby obtain serial interface information associated with at least one target apparatus to which the extracted data packet is transmitted; and
    a serial communication unit to transmit the extracted data packet to the at least one target apparatus via a corresponding serial interface based on the serial interface information,
    wherein the buffer manager stores the data packet in an overwritable buffer or a non-overwritable buffer according to the characteristic of the data packet,
    wherein the non-overwritable buffer is configured into a first-in-first-out (FIFO) form,
    wherein in storing the data packet in the overwritable buffer, the buffer manager sets and maintains a number of buffers using at least one of a destination IP address, a UDP port number, a TCP port number, and a transmission end address.

2. The gateway apparatus according to claim 1, further comprising:
    a group manager to manage group information associated with a group including a plurality of target apparatuses corresponding to the destination address of the extracted data packet and serial interface information corresponding to each of the target apparatuses included in the group.

3. The gateway apparatus according to claim 2, wherein the group manager performs snooping of a message received from target apparatuses connected via each corresponding serial interface to set the group information.

4. The gateway apparatus according to claim 2, wherein the group manager sets the group information according to a characteristic of target apparatuses connected via each corresponding serial interface.

5. The gateway apparatus according to claim 1, wherein in verifying the characteristic of the data packet received via the Ethernet interface, the buffer manager uses a destination Internet Protocol (IP) address of the data packet, a User Datagram Protocol (UDP) port number, or a Transmission Control Protocol (TCP) port number.

6. The gateway apparatus according to claim 1, wherein the serial interface corresponds to a serial interface based on National Marine Electronics Association (NMEA) 0183.

7. The gateway apparatus according to claim 1, wherein in storing the data packet in the overwritable buffer, the buffer manager stores the data packet by including information associated with a stored time.

8. The gateway apparatus according to claim 7, wherein in storing the data packet in the overwritable buffer, when the same type of a data packet exists in the corresponding buffer, the buffer manager stores the data packet by replacing the existing data packet with a newly received data packet.

9. The gateway apparatus according to claim 7, wherein when extracting a data packet from the overwritable buffer, the packet scheduler priorly extracts a most previously stored data packet based on information associated with the stored time.

10. A method of processing data at a gateway apparatus, the method comprising:
receiving a data packet via an Ethernet interface;
verifying a characteristic of the received data packet to select a buffer for storing the data packet;
storing the data packet in the selected buffer;
extracting a data packet from the buffer according to a predetermined policy;
verifying a destination address of the extracted data packet to thereby obtain serial interface information associated with at least one target apparatus to which the extracted data packet is transmitted; and
transmitting the extracted data packet to the at least one target apparatus via a corresponding serial interface based on the serial interface information,
wherein the buffer for storing the data packet corresponds to an overwritable buffer or a non-overwritable buffer according to the characteristic of the data packet
wherein the non-overwritable buffer is configured into a FIFO form,
wherein in storing the data packet in the overwritable buffer, the buffer manager sets and maintains a number of buffers using at least one of a destination IP address, a UDP port number, a TCP port number, and a transmission end address.

11. The method according to claim 10, further comprising:
managing group information associated with a group including a plurality of target apparatuses corresponding to the destination address of the extracted data packet and serial interface information corresponding to each of the target apparatuses included in the group.

12. The method according to claim 11, wherein the managing of the group information including the plurality of target apparatuses comprises performing snooping of a message received from target apparatuses connected via each corresponding serial interface to set the group information.

13. The method according to claim 11, wherein the managing of the group information including the plurality of target apparatuses comprises setting the group information according to a characteristic of target apparatuses connected via each corresponding serial interface.

14. The method according to claim 10, wherein the verifying of the characteristic of the received data packet comprises using a destination IP address of the data packet, a UDP port number, or a TCP port number.

15. The method according to claim 10, wherein in storing the data packet in the overwritable buffer, the data packet is stored by including information associated with a stored time.

* * * * *